United States Patent
Kim et al.

(10) Patent No.: US 9,014,272 B2
(45) Date of Patent: Apr. 21, 2015

(54) METHOD AND APPARATUS FOR GENERATING INTERPOLATED FRAME BETWEEN ORIGINAL FRAMES

(75) Inventors: Seung-gu Kim, Seoul (KR); Tae-gyoung Ahn, Yongin-si (KR); Se-hyeok Park, Seoul (KR); Young-ho Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 13/284,342

(22) Filed: Oct. 28, 2011

(65) Prior Publication Data

US 2012/0314770 A1    Dec. 13, 2012

(30) Foreign Application Priority Data

Jun. 8, 2011    (KR) .................. 10-2011-0055274

(51) Int. Cl.
*H04N 7/26* (2006.01)
*H04N 19/59* (2014.01)
*H04N 19/51* (2014.01)
*H04N 19/132* (2014.01)
*H04N 19/184* (2014.01)
*H04N 19/48* (2014.01)
*H04N 19/587* (2014.01)

(52) U.S. Cl.
CPC .............. *H04N 19/59* (2014.11); *H04N 19/51* (2014.11); *H04N 19/132* (2014.11); *H04N 19/184* (2014.11); *H04N 19/48* (2014.11); *H04N 19/587* (2014.11)

(58) Field of Classification Search
CPC .................. H04N 19/00751; H04N 19/00733; H04N 19/00563; H04N 19/00757; H04N 19/00309; H04N 19/00127; H04N 7/0117; H04N 7/0135; H04N 7/014; H04N 7/26776; H04N 7/26877; H04N 19/184; H04N 19/587; H04N 19/48; A01B 12/006
USPC ..................................... 375/240.16
See application file for complete search history.

(56) References Cited

U.S. PATENT DOCUMENTS

| | | | | |
|---|---|---|---|---|
| 2001/0017891 A1* | 8/2001 | Boyce et al. | ............. | 375/240.21 |
| 2005/0213661 A1* | 9/2005 | Xiang et al. | ............. | 375/240.16 |
| 2005/0226332 A1* | 10/2005 | Uetani | ............. | 375/240.16 |
| 2008/0126812 A1* | 5/2008 | Ahmed et al. | ............. | 713/189 |
| 2010/0166061 A1* | 7/2010 | Kondo et al. | ............. | 375/240.03 |
| 2010/0201870 A1* | 8/2010 | Luessi et al. | ............. | 348/452 |
| 2011/0141349 A1* | 6/2011 | Albuz et al. | ............. | 348/441 |
| 2012/0114036 A1* | 5/2012 | Po et al. | ............. | 375/240.12 |
| 2013/0051471 A1* | 2/2013 | Ahn et al. | ............. | 375/240.15 |
| 2013/0156109 A1* | 6/2013 | Lagrange et al. | ......... | 375/240.21 |
| 2013/0176447 A1* | 7/2013 | Nakashima | ............. | 348/208.4 |
| 2013/0176487 A1* | 7/2013 | Nakashima | ............. | 348/452 |

\* cited by examiner

*Primary Examiner* — Richard Torrente
*Assistant Examiner* — Joseph Suh
(74) *Attorney, Agent, or Firm* — Sughrue Mion, PLLC (57) ABSTRACT

A method and apparatus for generating an interpolated frame are provided. The method includes: generating a motion vector for generating a third frame by performing motion estimation based on first image data and second image data, the first image data being a portion of image data of a first frame and the second image data being a portion of image data of a second frame; restoring the image data of the first frame based on the first image data and the image data of the second frame based on the second image data; and generating the third frame by performing motion compensation based on at least one of the restored image data of the first frame and the restored image data of the second frame and the generated motion vector.

18 Claims, 7 Drawing Sheets

| P01-P00 | 0 | P03-P02 |
|---|---|---|
| 0 | P12-P02 | P13-P02 |
| P11-P00 | | |
| P21-P20 | 0 | P23-P22 |
| P31-P20 | P32-P22 | P33-P22 |
| 0 | | |
| P30-P20 | | |

410

↑ PACKING

| P01-P00 | P12-P02 | P03-P02 |
|---|---|---|
| P10-P00 | P11-P00 | P13-P02 |
| P21-P20 | P32-P22 | P23-P22 |
| P30-P20 | P31-P20 | P33-P22 |

METHOD AND APPARATUS FOR GENERATING INTERPOLATED FRAME BETWEEN ORIGINAL FRAMES

CROSS-REFERENCE TO RELATED PATENT APPLICATION

This application claims priority from Korean Patent Application No. 10-2011-0055274, filed on Jun. 8, 2011 in the Korean Intellectual Property Office, the disclosure of which is incorporated herein in its entirety by reference.

BACKGROUND

1. Field

Apparatuses and methods consistent with exemplary embodiments relate to controlling a frame rate, and more particularly, to controlling a frame rate by generating a new frame by interpolating frames of an original moving picture.

2. Description of the Related Art

Recently, methods of converting a frame rate of an original moving picture have been developed. For example, when a frame rate of an original moving picture is 60 Hz, the frame rate may be converted into 120 Hz or 240 Hz by interpolating frames of the original moving picture to generate an interpolated frame. As a frame rate is converted, a moving picture with few afterimages may be generated and reproduced.

SUMMARY

Aspects of exemplary embodiments provide a method and apparatus for controlling a frame rate, and a computer readable recording medium having recorded thereon a program for executing the method.

According to an aspect of an exemplary embodiment, there is provided a method of generating a third frame between a first frame and a second frame, the method including: generating a motion vector for generating the third frame by performing motion estimation based on first image data that is a portion of image data of the first frame and second image data that is a portion of image data of the second frame; restoring the image data of the first frame based on the first image data and the image data of the second frame based on the second image data; and generating the third frame by performing motion compensation, based on the restored image data of the first frame and the restored image data of the second frame, and the generated motion vector.

The first image data may be generated by sub-sampling the first frame, and the second image data may be generated by sub-sampling the second frame.

The first image data may be generated by performing bit truncation on pixel values of the first frame, and the second image data may be generated by performing bit truncation on pixel values of the second frame.

The first image data may be generated by converting pixel values of a pixel domain of the first frame according to a predetermined algorithm to generate coefficients of a frequency domain of the first frame, and extracting some of the generated coefficients of the frequency domain of the first frame, and the second image data may be generated by converting pixel values of a pixel domain of the second frame according to the predetermined algorithm to generate coefficients of a frequency domain of the second frame, and extracting some of the generated coefficients of the frequency domain of the second frame.

The generating of the motion vector may include extracting the first image data from the image data of the first frame and extracting the second image data from the image data of the second frame; storing, in a predetermined storage device, first remaining image data obtained by excluding the first image data from the image data of the first frame and second remaining image data obtained by excluding the second image data from the image data of the second frame; and generating the motion vector by performing motion estimation based on extracted the first image data and the extracted second image data.

The restoring of the image data of the first frame and the image data of the second frame may include reading the stored first remaining image data and the stored second remaining image data from the predetermined storage device; and restoring the image data of the first frame based on the read first remaining image data and at least one of the first image data and the second image data, and restoring the image data of the second frame based on the read second remaining image data and at least one of the first image data and the second image data.

The storing of the first remaining image data and the second remaining image data may include compressing the first remaining image data and the second remaining image data according to a predetermined compression algorithm and storing the compressed first remaining image data and the compressed second remaining image data.

The compressing of the first remaining image data and the second remaining image data may include generating residual values corresponding to pixel values included in at least one of the first remaining image data and the second remaining image data by performing intra prediction.

The compressing of the first remaining image data and the second remaining image data may include performing bit truncation on the residual values.

According to an aspect of another exemplary embodiment, there is provided an apparatus for generating a third frame between a first frame and a second frame, the apparatus including: a motion estimator which generates a motion vector for generating the third frame by performing motion estimation, based on first image data that is a portion of image data of the first frame and second image data that is a portion of image data of the second frame; an original image restorer which restores the the image data of the first frame based on the first image data and the image data of the second frame based on the second image data; and a motion compensator which generates the third frame by performing motion compensation, based on the restored image data of the first frame and the restored image data of the second frame, and the generated motion vector.

According to an aspect of another exemplary embodiment, there is provided a computer readable recording medium having recorded thereon a program for executing the method.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Hereinafter, exemplary embodiments will be described in detail with reference to the attached drawings. Expressions such as "at least one of," when preceding a list of elements, modify the entire list of elements and do not modify the individual elements of the list.

Figure 1:
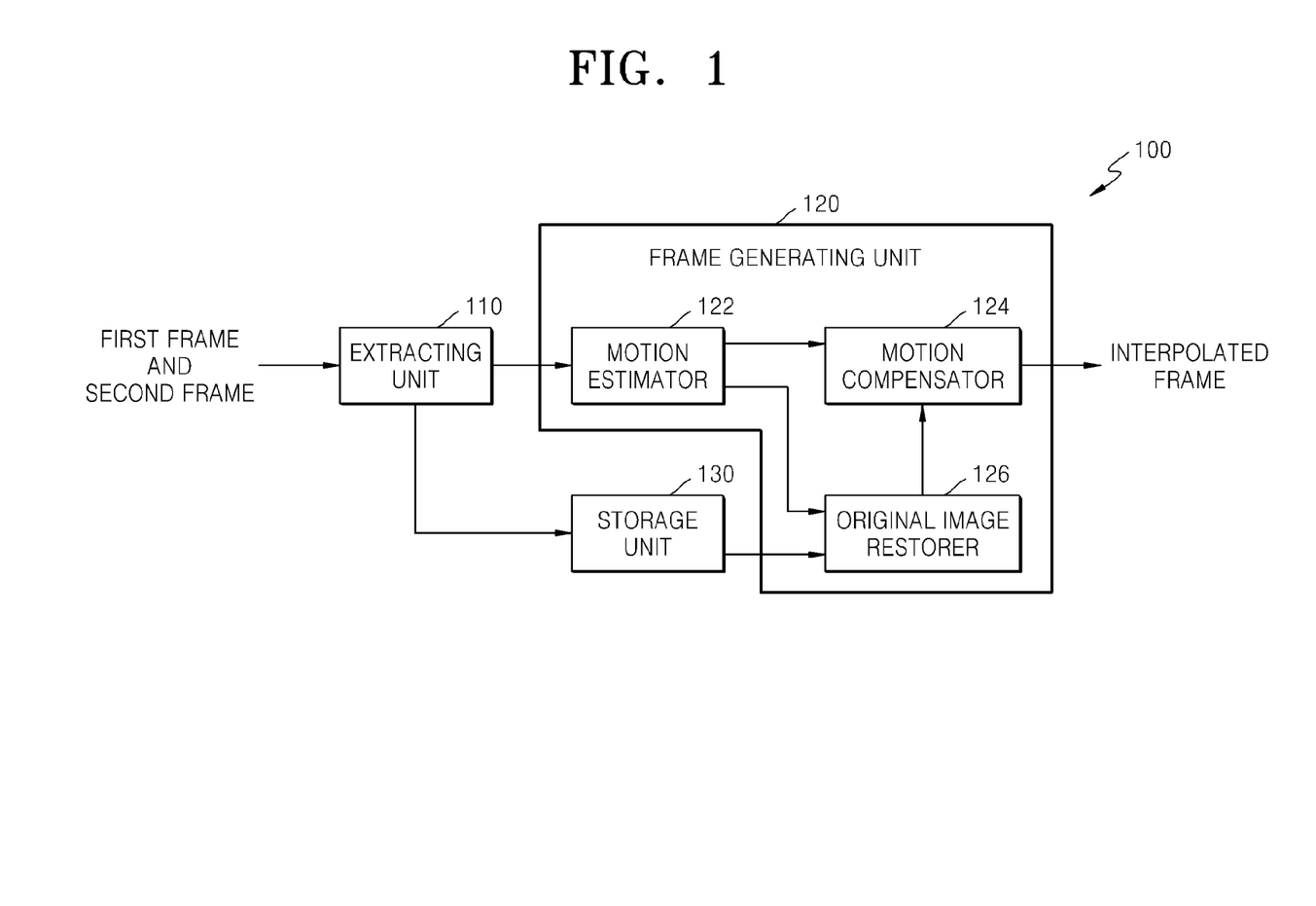
FIG. 1 is a block diagram of a frame generating apparatus according to an exemplary embodiment.

FIG. 1 is a block diagram of a frame generating apparatus 100 according to an exemplary embodiment.

Referring to FIG. 1, the frame generating apparatus 100 includes an extracting unit 110, a frame generating unit 120, and a storage unit 130.

The extracting unit 110 extracts a portion of original image data of frames received by the frame generating apparatus 100. In other words, when a third frame is generated by interpolating a first frame and a second frame in order to convert a frame rate, a portion of image data of the first frame and a portion of image data of the second frame are extracted.

In order to minimally use a data bus for connecting hardware modules to each other, an amount of data transmitted between the hardware modules may be reduced. To this end, when the third frame is generated by interpolating the first frame and the second frame, the frame generating apparatus 100 uses only a portion (hereinafter, referred to as the 'first image data') of image data of the first frame and a portion (hereinafter, referred to as the 'second image data') of image data of the second frame. Since the third frame is generated by using only a portion of original image data, an amount of data transmitted between modules of the frame generating apparatus 100 is reduced, and an amount of data that is to be stored in a storage device to be referred to in order to generate the third frame is reduced. Since computational complexity for generating the third frame may be lowered by using only a portion of the original image data, the third frame may be generated at a high speed.

To this end, the extracting unit 110 extracts only a portion of input original image data for generating the third frame, and transmits the portion to a motion estimator 122. The first image data and the second image data are transmitted to the motion estimator 122. Remaining image data (hereinafter, referred to the 'first remaining image data') obtained by excluding the first image data from the image data of the first frame and remaining image data (hereinafter, referred to the 'second remaining image data') obtained by excluding the second image data from the image data of the second frame are stored in the storage unit 130.

Figure 2A:
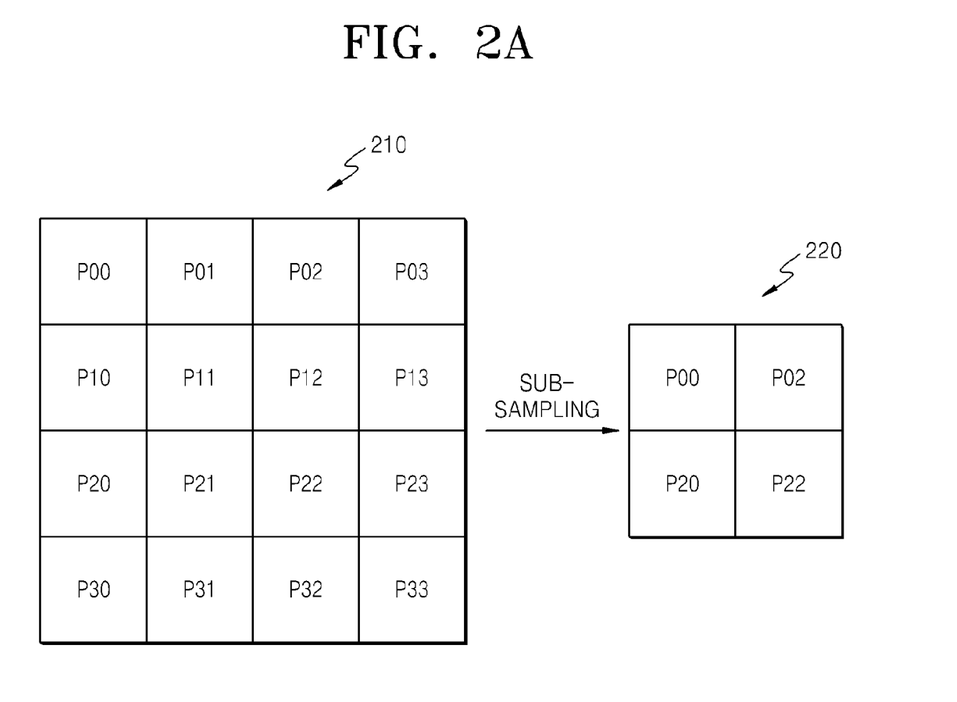
FIGS. 2A and 2B are diagrams for describing methods of extracting a portion of original image data, according to one or more exemplary embodiments.
Figure 2B:
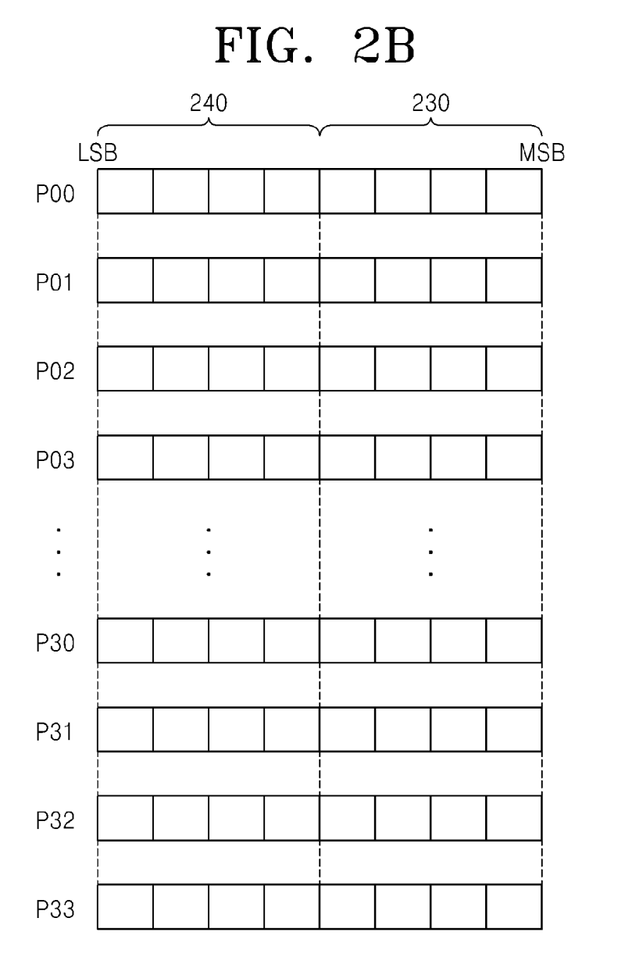

FIGS. 2A and 2B are diagrams for describing methods of extracting a portion of original image data, according to one or more exemplary embodiments.

Referring to FIG. 2A, the extracting unit 110 may extract the first image data and the second image data by using a sub-sampling method. FIGS. 2A and 2B show a case where only four pixels 220 from among 16 pixels 210 are extracted. By performing the same sub-sampling on the first frame and the second frame, the first image data and the second image data may be extracted.

In addition, as shown in FIG. 2B, the extracting unit 110 may extract the first image data and the second image data by using bit truncation. For example, when pixel values of the first frame are 8 bits, four lower bits 240 of the pixel values of the first frames may be truncated, and only four higher bits 230 may be extracted as the first image data. The second image data may be extracted by using the same method as a method of extracting the first image data. That is, the second image data may be extracted by truncating lower bits of image data of the second frame.

FIGS. 2A and 2B show methods of extracting a portion of original image data. However, it is understood that one or more other exemplary embodiments are not limited to the methods of FIGS. 2A and 2B. That is, any method of extracting a portion of the original image data may be used. For example, according to an exemplary embodiment, the extracting unit 110 may convert pixel values of the first frame and pixel values of the second frame in a pixel domain according to a predetermined algorithm to generate coefficients of another domain, and may extract some of the coefficients. For example, the extracting unit 110 may convert (e.g., discrete cosine transform, Hadamard transform, etc.) the pixel values of the first frame and the pixel values of the second frame in a pixel domain to generate coefficients of a frequency domain.

Then, some of the coefficients of the frequency domain may be extracted. In this case, only coefficients corresponding to a low frequency or a high frequency may be extracted by filtering the coefficients of the frequency domain, or some of the coefficients of the frequency domain may be extracted by sub-sampling some of the coefficients. In addition, the first image data and the second image data may be extracted by truncating bits of the coefficients of the frequency domain.

The frame generating unit 120 generates the third frame between the first frame and the second frame, based on the first image data and the second image data, which are extracted by the extracting unit 110. The frame generating unit 120 may generate the third frame with reference to at least one of image data of the first frame and image data of the second frame, which are restored by an original image restorer 126. A method of generating the third frame with reference to the restored image data of the first frame and the restored image data of the second frame will be described in detail below with reference to a motion compensator 124.

The method of generating the third frame by the frame generating unit 120 is not limited to exemplary embodiments described herein. In other words, any method of generating an interpolated frame by interpolating the first frame and the second frame may be used. Hereinafter, a method of generating an interpolated frame according to motion estimation and motion interpolation, which is performed by the frame generating unit 120, will be described in more detail.

The frame generating unit 120 includes the motion estimator 122, the motion compensator 124, and an original image restorer 126.

The motion estimator 122 generates at least one motion vector for generating the third frame, based on the first image data and the second image data that are extracted by the extracting unit 110, which will be described in detail with reference to FIG. 3.

Figure 3:
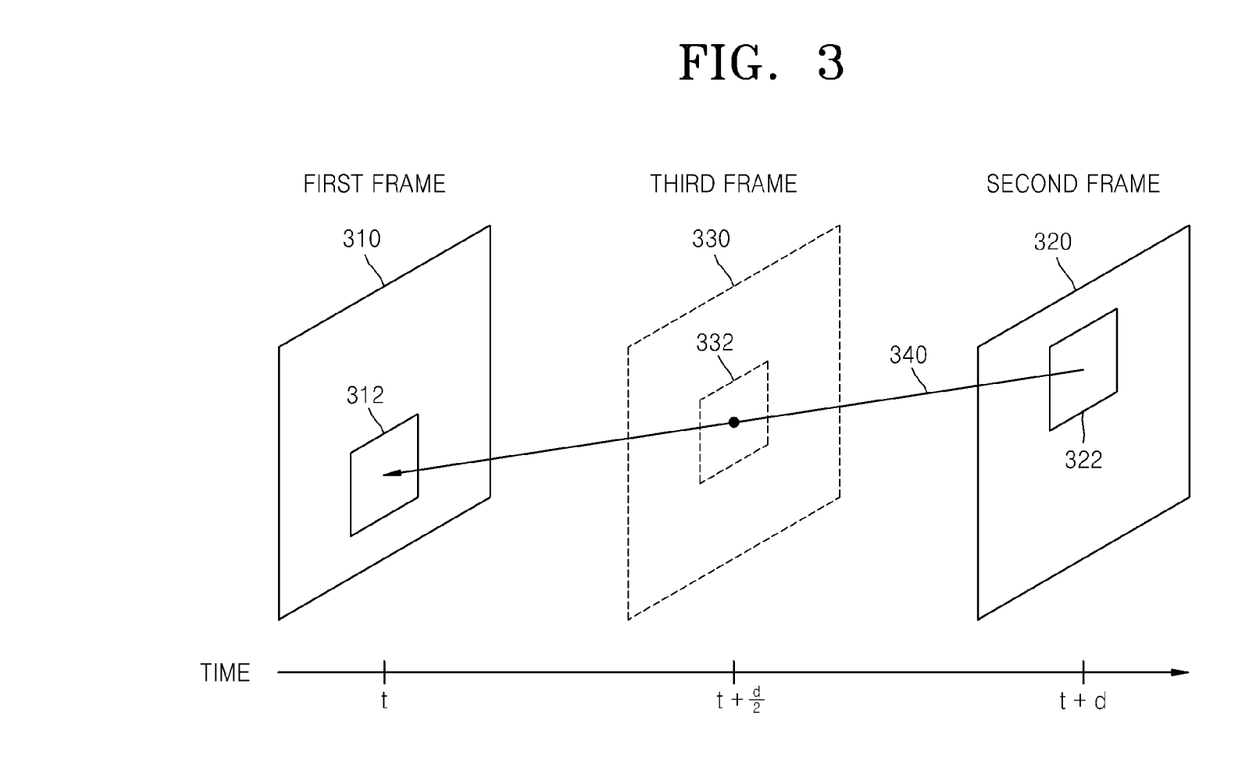
FIG. 3 is a diagram for describing a method of interpolating original frames, according to an exemplary embodiment.

FIG. 3 is a diagram for describing a method of interpolating original frames, according to an exemplary embodiment.

Referring to FIG. 3, a motion vector 340 is estimated in order to generate a third frame 330 by interpolating a first frame 310 of a time 't' and a second frame 320 of a time 't+d'. A block 312 that is similar to a block 322 of the second frame 320 is searched for in the first frame 310, and the motion vector 340 is estimated based on the searching result. When the motion vector 340 is estimated, a block 332 of the third frame 330 may be generated by performing motion compensation based on the estimated motion vector 340, as described below with reference to the motion compensator 124.

Thus, at least one motion vector about at least one block included in the second frame 320 is used in order to generate the third frame 330 between the first frame 310 and the second frame 320 by performing motion compensation, and the motion estimator 122 estimates the at least one motion vector.

The motion compensator 124 generates the third frame by performing motion compensation based on the at least one motion vector estimated by the motion estimator 122. A position of the block 332 of the third frame 330, which corresponds to the block 322 of the second frame 320, is determined based on the motion vector, and pixel values of the block 332 are determined based on at least one of pixel values of the block 312 of the first frame 310 and pixel values of the block 322 of the second frame 320. The third frame 330 may be generated by repeatedly performing motion compensation for each respective block on all blocks.

When the extracting unit 110 extracts the first image data and the second image data by using the sub-sampling method, as described above, an estimated motion vector itself may be used to perform motion compensation. For example, as shown in FIG. 2A, horizontal resolution and vertical resolution are each reduced to ½ an original resolution through sub-sampling to generate the first image data and the second image data. In addition, when a motion vector is estimated, the estimated motion vector is the same as a motion vector that is obtained by scaling the motion vector 340 of FIGS. 3 to ½ the motion vector 340. However, since the third frame 330 is positioned to correspond to ½ of a period of time between the first frame 310 and the second frame 320, the motion vector itself, which is obtained by scaling the motion vector 340 of FIG. 3 to ½ the motion vector 340, may be used in motion compensation.

When pixel values of the first image data and the second image data in a pixel domain, which are extracted by the extracting unit 110, are converted to generate coefficients of another domain, and some of the coefficients are extracted, the extracted coefficients are inverse-transformed to restore the first image data and the second image data to pixel values of the pixel domain, and a motion vector may be estimated based on the first image data and the second image data in the pixel domain.

In addition, as described above, when the motion estimator 122 estimates at least one motion vector, the first image data and the second image data are used. However, the motion compensator 124 may not generate the third frame 330 by using only the first image data and the second image data. This is because at least one of the first frame and the second frame is used to perform motion compensation, as shown in FIG. 3, and the first image data and the second image data are a portion of the image data of the first frame and a portion of the image data of the second frame, respectively.

Thus, the original image restorer 126 restores at least one of the image data of the first frame and the image data of the second frame, based on at least one of the first image data and the second image data. The original image restorer 126 reads at least one of the first remaining image data and the second remaining image data, which are stored in the storage unit 130. Then, the image data of the first frame is restored by combining the first remaining image data and the first image data. In addition, the image data of the second frame is restored by combining the second remaining image data and the second image data. Image data of at least one frame that is used to perform motion compensation is restored from among the first frame and the second frame.

The storage unit 130 receives and stores at least one of the first remaining image data and the second remaining image data from the extracting unit 110. As described above, when the frame generating unit 120 generates the third frame, at least one of the image data of the first frame and the image data of the second frame, that is, original image data, may be used. Thus, the storage unit 130 stores at least one of the first remaining image data and the second remaining image data so that at least one of the first remaining image data and the second remaining image data may be used to restore the original image data.

The storage unit 130 may store at least one of the first remaining image data and the second remaining image data according to a predetermined compression algorithm. In this case, the at least one of the first remaining image data and the second remaining image data themselves may not be stored, but are compressed and stored according to a predetermined compression algorithm, thereby effectively using the storage capacity, as described in detail with reference to FIGS. 4 through 6.

Figure 4:
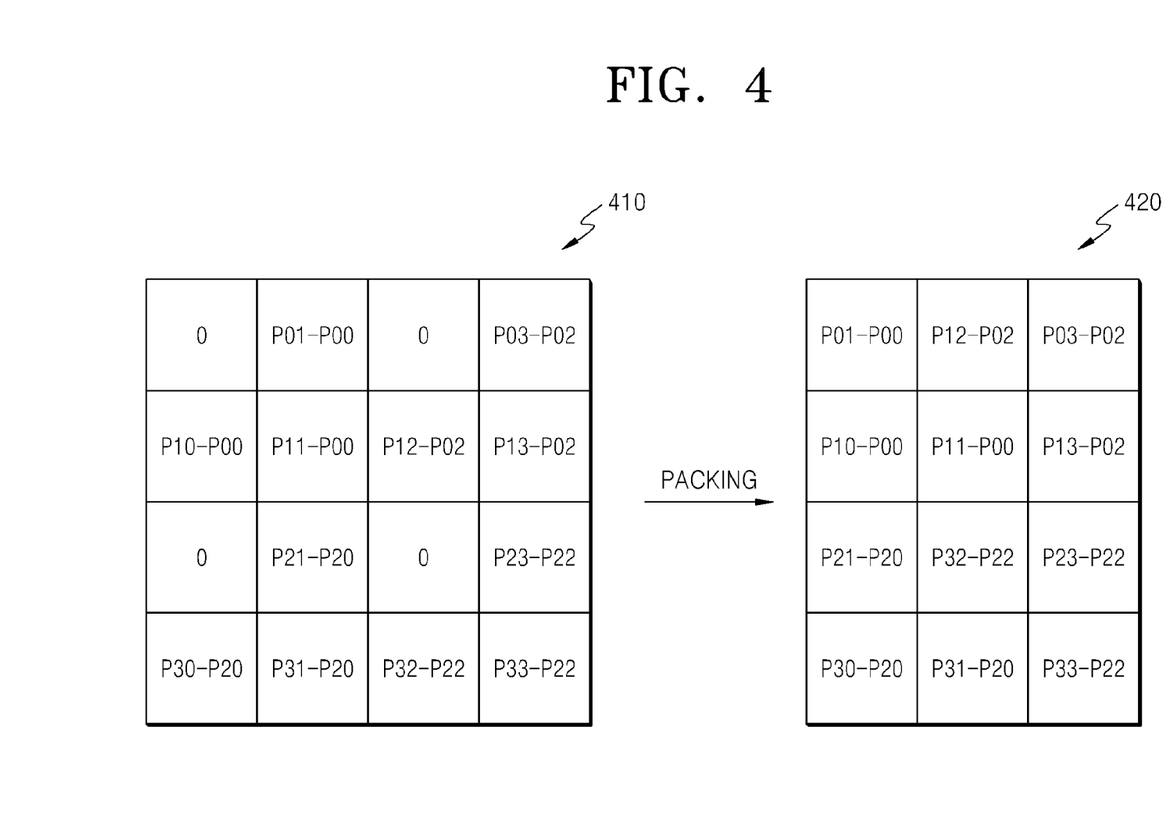
FIG. 4 is a diagram for describing a method of compressing image data, according to an exemplary embodiment.

FIG. 4 is a diagram for describing a method of compressing image data, according to an exemplary embodiment.

Referring to FIG. 4, the storage unit 130 may store at least one of the first remaining image data and the second remaining image data by performing intra prediction. For example, as described with reference to FIG. 2A, when the original image data includes 16 pixel values, and the extracting unit 110 extracts only four pixel values as the first image data or the second image data through sub-sampling, pixel values other than the extracted pixel values may be compressed by performing intra prediction. In this case, intra prediction refers to a method of generating a prediction value based on a neighboring pixel value and generating a residual value that is a difference between the prediction value and the pixel value.

In FIG. 4, a left block 410 is a result of intra prediction. Pixel values P01, P10, and P11 are intra-predicted based on P00 to generate residual values corresponding to the pixel values P01, P10, and P11. Pixel values P03, P12, and P13 are intra-predicted based on P02, and pixel values P21, P30, and P31 are intra-predicted based on P20. In addition, pixel values P23, P32, and P33 are intra-predicated based on P22.

When all residual values are generated by performing intra prediction, pixel values extracted by the extracting unit 110 are removed by generating a right block 420 of FIG. 4 through packing. The pixel values extracted by the extracting unit 110 do not need to be transmitted to the frame generating unit 120 and do not need to be stored in the storage unit 130, and thus, the pixel values are removed.

Figure 5:
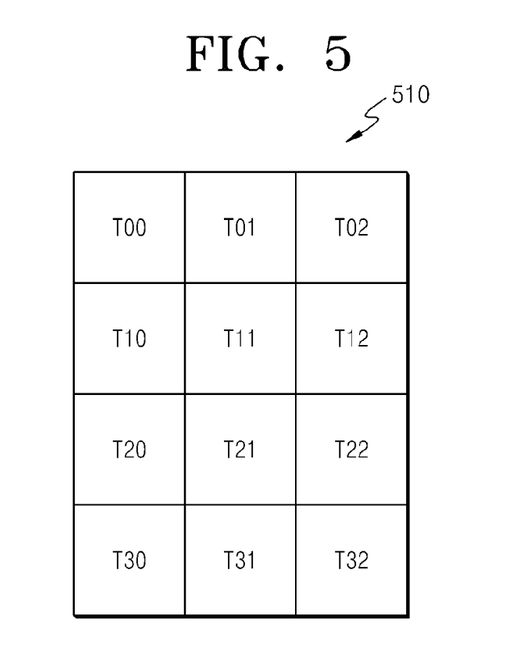
FIG. 5 is a diagram for describing a method of compressing a portion of image data, according to another exemplary embodiment.

FIG. 5 is a diagram for describing a method of compressing a portion of image data, according to another exemplary embodiment.

When the right block 420 of FIG. 4 is generated by performing intra prediction, the residual values included in the right block 420 may be compressed once more by using bit truncation, as shown in FIG. 5. Since neighboring pixel values are likely to be similar to each other, absolute values of the residual values generated by performing intra prediction are not high. In other words, when residual values are expressed in the binary numeral system, upper bit rates may likely be '0'.

For example, when pixel values of a first image frame and a second image frame are 8 bits, residual values included in the right block 420 of FIG. 4, which are generated by performing intra prediction, may also be 8 bits. However, when the residual values are small, upper bits of the residual values may likely be '0'. Thus, the upper bits may be removed by bit truncation. That is, bit truncation may be performed on the residual values included in the right block 420 of FIG. 4 so as to generate a block 510 including pixel values T00 through T32 of FIG. 5. When bit truncation is performed on upper bits, a fixed number of bits may be truncated, or a predetermined number of bits may be truncated so as not to generate loss.

T00 is a value generated by performing bit truncation on residual values P01 through P00. T01 is a value generated by performing bit truncation on residual values P12 through P02. T02 through T32 are values generated by performing bit truncation on colocated residual values of the right block 420 of FIG. 4.

Figure 6:
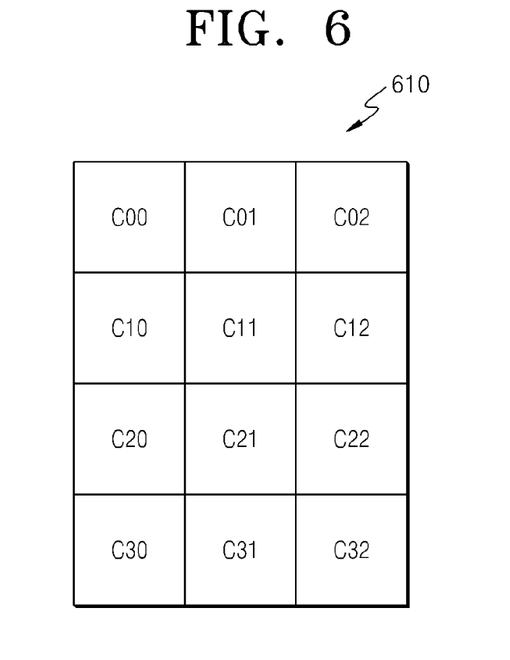
FIG. 6 is a diagram for describing an operation of compressing image data, according to another exemplary embodiment.

FIG. 6 is a diagram for describing an operation of compressing image data, according to another exemplary embodiment.

When residual values are compressed by performing bit truncation, as shown in FIG. 5, the residual values may be compressed once again by using bit truncation. For example, neighboring values may be intra-predicted based on T01. In other words, C00=T00-T01, C02=T02-T01, C10=T10-T01, C11=T11-T01, and C12=T12-T01. Similarly, C20 through C32 may be intra-predicted based on T21. That is, C20=T20-T21, C22=T22-T21, C30=T30-T21, C31=T31-T21, and C32=T32-T21.

As described with reference to FIGS. 4 through 6, the first remaining image data and the second remaining image data are compressed and are stored in the storage unit 130, thereby effectively using the storage capacity of the storage unit 130. When the frame generating unit 120 refers to the storage unit 130 in order to restore original image data, the storage unit 130 transmits at least one of the first remaining image data and the second remaining image data to the frame generating unit 120, thereby effectively using a data bus.

The frame generating unit 120, in particular, the original image restorer 126, restores at least one of the first remaining image data and the second remaining image data by reading at least one of the first remaining image data and the second remaining image data from the storage unit 130, and decompressing the read at least of the first remaining image data and the second remaining image data. Decompression of the first remaining image data and the second remaining image data may be realized by using an inverse method of a method used to compress the first remaining image data and the second remaining image data.

At least one of the image data of the first frame and the image data of the second frame is restored based on at least one of the first remaining image data and the second remaining image data, and is used for motion compensation.

Figure 7:
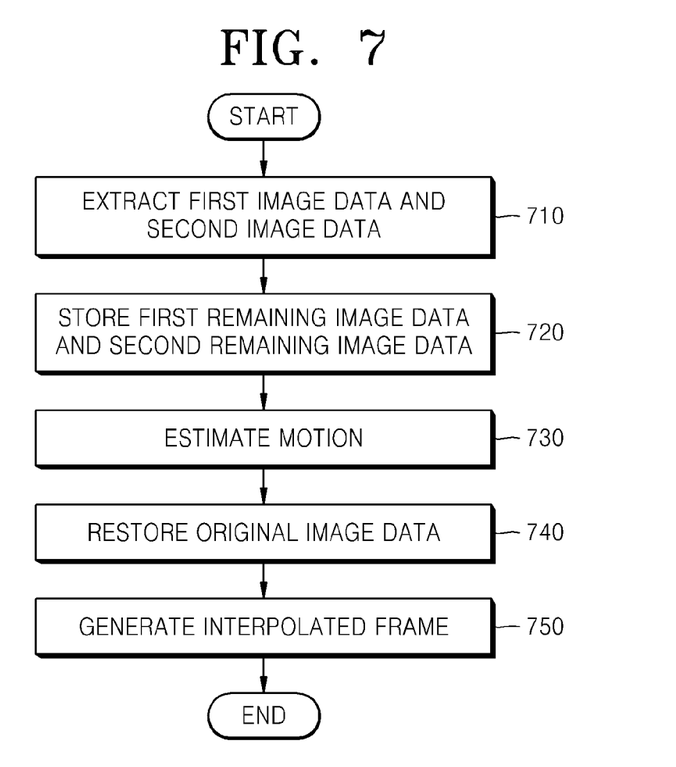
FIG. 7 is a flowchart of a method of generating a frame, according to an exemplary embodiment.

FIG. 7 is a flowchart of a method of generating a frame, according to an exemplary embodiment.

Referring to FIG. 7, in operation 710, a frame generating apparatus according to an exemplary embodiment extracts a portion of original image data. The first image data that is a portion of image data of the first frame is extracted, and the second image data that is a portion of image data of the second frame is extracted.

In operation 720, the frame generating apparatus stores remaining image data other than the data that is extracted in operation 710 in a predetermined storage device. In order to generate the third frame between the first frame and the second frame based on motion compensation, since the original image data is to be restored, at least one of the first remaining image data and the second remaining image data is stored in a predetermined storage device in order to restore the original image data.

In operations 730 through 750, an interpolated frame is generated between original frames, based on a portion of the original image data extracted in operation 710.

In operation 730, the frame generating apparatus generates at least one motion vector used to generate the interpolated frame by performing motion estimation based on the portion of the original image data extracted in operation 710. The at least one motion vector used to generate the third frame between the first frame and the second frame is generated by performing motion estimation, based on the first image data and the second image data which are extracted in operation 710.

In operation 740, the frame generating apparatus restores the original image data. At least one of the image data of the first frame and the image data of the second frame is restored. The image data of the first frame may be restored based on the first image data extracted in operation 710 and the first remaining image data stored in operation 720, and the image data of the second frame may be restored based on the second image data extracted in operation 710 and the second remaining image data stored in operation 720. At least one of the first remaining image data and the second remaining image data may be read from a predetermined storage device, and the original image data may be restored based on the read data.

In operation 750, the frame generating apparatus generates the interpolated frame based on the original image data restored in operation 740. The third frame between the first frame and the second frame may be generated based on at least one of the image data of the first frame and the image data of the second frame, which are restored in operation 740. When motion compensation is performed, at least one motion vector generated in operation 730 may be used.

According to one or more exemplary embodiments, an interpolated frame between original frames is generated by using a portion of image data of an original frame, and motion estimation and motion compensation may be performed at a high speed. In addition, since an amount of data used to generate the interpolated frame is small, a memory for storing data and a data bus for transmitting and receiving data may be effectively used.

While exemplary embodiments have been particularly shown and described above, it will be understood by one of ordinary skill in the art that various changes in form and details may be made therein without departing from the spirit and scope of the inventive concept as defined by the following claims and their equivalents. Also, one or more exemplary embodiments can also be embodied as computer readable codes on a computer readable recording medium.

For example, the frame generating apparatus illustrated in FIG. 1 may include a bus coupled to every unit of the apparatus, at least one processor that is connected to the bus and is for executing commands, and memory connected to the bus to store the commands, received messages, and generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

What is claimed is:
1. A method of generating a third frame between a first frame and a second frame, the method comprising:

generating at least one motion vector for generating the third frame by performing motion estimation based on first image data and second image data, the first image data being a portion of image data of the first frame and the second image data being a portion of image data of the second frame;

restoring the image data of the first frame based on first remaining image data and at least one of the first image data and the second image data, and restoring the image data of the second frame based on second remaining image data and at least one of the first image data and the second image data; and generating the third frame by performing motion compensation based on at least one of the restored image data of the first frame and the restored image data of the second frame and the generated at least one motion vector, wherein the first remaining image data is obtained by excluding the first image data from the image data of the first frame and the second remaining image data is obtained by excluding the second image data from the image data of the second frame, the first image data and the second image data are used for motion estimation, and the first remaining image data and the second remaining image data are not used for motion estimation.

2. The method of claim 1, wherein:

the first image data is generated by sub-sampling the first frame; and the second image data is generated by sub-sampling the second frame.

3. The method of claim 1, wherein:

the first image data is generated by performing bit truncation on pixel values of the first frame; and the second image data is generated by performing bit truncation on pixel values of the second frame.

4. The method of claim 1, wherein:

the first image data is generated by converting pixel values of a pixel domain of the first frame according to a predetermined algorithm to generate coefficients of a frequency domain of the first frame, and extracting some of the generated coefficients of the frequency domain of the first frame; and the second image data is generated by converting pixel values of a pixel domain of the second frame according to the predetermined algorithm to generate coefficients of a frequency domain of the second frame, and extracting some of the generated coefficients of the frequency domain of the second frame.

5. The method of claim 1, wherein the generating of the at least one motion vector comprises:

extracting the first image data from the image data of the first frame and extracting the second image data from the image data of the second frame;

storing, in a predetermined storage device, the first remaining image data obtained by excluding the first image data from the image data of the first frame and the second remaining image data obtained by excluding the second image data from the image data of the second frame; and generating the at least one motion vector by performing motion estimation based on the extracted first image data and the extracted second image data.

6. The method of claim 5, wherein the restoring of the image data of the first frame and the image data of the second frame comprises:

reading the stored first remaining image data and the stored second remaining image data from the predetermined storage device; and restoring the image data of the first frame based on the read first remaining image data and at least one of the first image data and the second image data, and restoring the image data of the second frame based on the read second remaining image data and at least one of the first image data and the second image data.

7. The method of claim 5, wherein the storing of the first remaining image data and the second remaining image data comprises compressing the first remaining image data and the second remaining image data according to a predetermined compression algorithm and storing the compressed first remaining image data and the compressed second remaining image data.

8. The method of claim 7, wherein the compressing of the first remaining image data and the second remaining image data comprises generating residual values corresponding to pixel values included in at least one of the first remaining image data and the second remaining image data by performing intra prediction.

9. The method of claim 8, wherein the compressing of the first remaining image data and the second remaining image data further comprises performing bit truncation on the residual values.

10. An apparatus for generating a third frame between a first frame and a second frame, the apparatus comprising:

a motion estimator which generates at least one motion vector for generating the third frame by performing motion estimation based on only first image data and second image data, the first image data being a portion of image data of the first frame and the second image data being a portion of image data of the second frame;

an original image restorer which restores the image data of the first frame based on first remaining image data and at least one of the first image data and the second image data and, restores the image data of the second frame based on second remaining image data and at least one of the first image data and the second image data; and a motion compensator which generates the third frame by performing motion compensation based on the restored image data of the first frame and the restored image data of the second frame and the generated at least one motion vector, wherein the first remaining image data is obtained by excluding the first image data from the image data of the first frame and the second remaining image data is obtained by excluding the second image data from the image data of the second frame, the first image data and the second image data are used for motion estimation, and the first remaining image data and the second remaining image data are not used for motion estimation.

11. The apparatus of claim 10, wherein:

the first image data is generated by sub-sampling the first frame; and the second image data is generated by sub-sampling the second frame.

12. The apparatus of claim 10, wherein:

the first image data is generated by performing bit truncation on pixel values of the first frame; and the second image data is generated by performing bit truncation on pixel values of the second frame.

13. The apparatus of claim 10, further comprising:

an extractor which extracts the first image data from the image data of the first frame and extracts the second image data from the image data of the second frame; and a storage unit which stores the first remaining image data obtained by excluding the first image data from the image data of the first frame and the second remaining image data obtained by excluding the second image data from the image data of the second frame.

14. The apparatus of claim 13, wherein the original image restorer reads the stored first remaining image data and the stored second remaining image data from the storage unit, and restores the image data of the first frame based on the read first remaining image data and at least one of the first image data and the second image data, and restores the image data of the second frame based on the read second remaining image data and at least one of the first image data and the second image data.

15. The apparatus of claim 13, wherein the storage unit compresses the first remaining image data and the second remaining image data according to a predetermined compression algorithm, and stores the compressed first remaining image data and the compressed second remaining image data.

16. The apparatus of claim 15, wherein the storage unit generates residual values corresponding to pixel values included in at least one of the first remaining image data and the second remaining image data by performing intra prediction.

17. The apparatus of claim 16, wherein the storage unit performs bit truncation on the residual values.

18. A non-transitory computer readable recording medium having recorded thereon a program for executing the method of claim 1.

* * * * *